(12) United States Patent
Sato et al.

(10) Patent No.: US 6,913,107 B2
(45) Date of Patent: Jul. 5, 2005

(54) STEER-BY-WIRE SYSTEM (75) Inventors: Koji Sato, Shizuoka-ken (JP); Atsushi Yoshioka, Shizuoka-ken (JP)

(73) Assignee: NTN Corporation, Osaka-fu (JP)

( * ) Notice: Subject to any disclaimer, the term of this patent is extended or adjusted under 35 U.S.C. 154(b) by 0 days.

(21) Appl. No.: 10/837,750

(22) Filed: May 4, 2004

(65) Prior Publication Data

US 2005/0000749 A1 Jan. 6, 2005

(30) Foreign Application Priority Data

May 27, 2003 (JP) ........................................ 2003-149216

(51) Int. Cl.[7] ................................................ B62D 5/00
(52) U.S. Cl. ........................... 180/402; 192/38; 192/44
(58) Field of Search .................................. 180/402, 403, 180/443, 444; 192/38, 44, 47, 89.4, 65

(56) References Cited

U.S. PATENT DOCUMENTS

| | | | |
|---|---|---|---|
| 1,065,635 A | | 6/1913 | Sweet |
| 4,852,707 A | | 8/1989 | Ito et al. |
| 6,138,788 A | * | 10/2000 | Bohner et al. ............... 180/405 |
| 6,442,462 B1 | * | 8/2002 | Nishizaki et al. ............. 701/41 |

FOREIGN PATENT DOCUMENTS

| | | |
|---|---|---|
| DE | 1146 710 | 4/1963 |
| DE | 100 15 922 A1 | 10/2001 |
| EP | 0 190 017 A | 8/1986 |

* cited by examiner

Primary Examiner—Daniel G. DePumpo
(74) Attorney, Agent, or Firm—Arent Fox (57) ABSTRACT A steer-by-wire system with a fail-safe mechanism is disclosed in which a clutch for the steer-by-wire system installed between a first shaft connected to a steering wheel and a second shaft connected to a steering gear is formed as a mechanism for bringing about wedgelike engagement of taper rollers by simple operation of turning an operating lever, so that when an abnormality detection sensor detects a defect in the steer-by-wire system, the clutch is operated through a clutch switching actuator to interconnect the first and second shafts and so as to make it possible to directly steer the steering gear.

12 Claims, 10 Drawing Sheets

STEER-BY-WIRE SYSTEM

BACKGROUND OF THE INVENTION

1. Field of the Invention

This invention relates to a steer-by-wire system having a fail-safe mechanism designed so that when a defect occurs in the steer-by-wire system, a shaft connected to a steering wheel is connected to a shaft that is connected to a steering gear, so as to make steering possible directly by the steering wheel.

2. Brief Description of the Prior Art

Though not commercially available at present, development of steer-by-wire systems in which the steering wheel is not mechanically connected to a steering gear is in progress in various places. This has merits, such as the capability of automatically controlling the wheel steering angle by car speed detection and increasing the degree of freedom of car interior layout, and is expected to enable more stabilized vehicle running and to improve driving performance.

Figure 10:
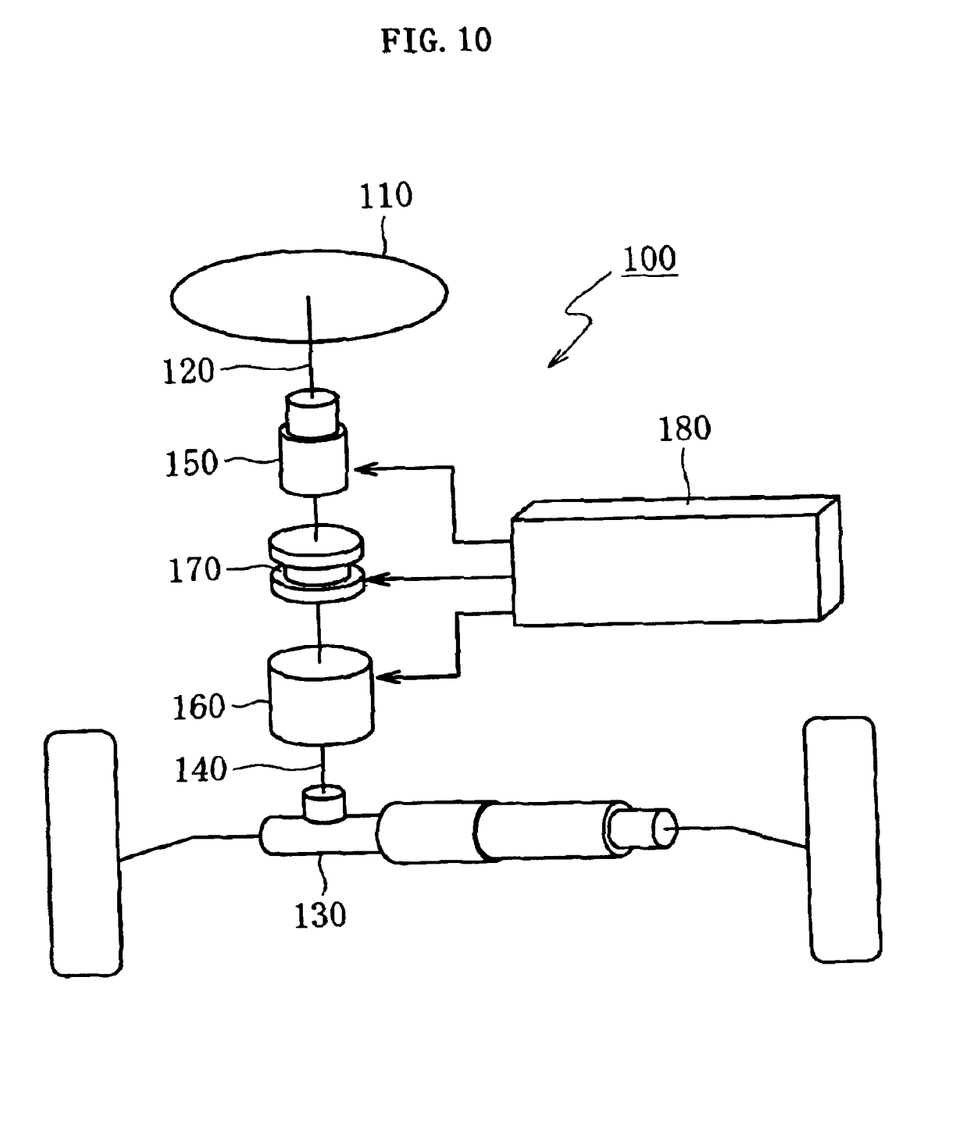
FIG. 10 is a schematic diagram of a steer-by-wire system using a conventional clutch.

An example of such steer-by-wire systems will be described with reference to FIG. 10. A steer-by-wire system 100, as shown in FIG. 10, comprises a steering wheel 110, a shaft 120 connected to the steering wheel 110, a steering gear 130, a shaft 140 connected to the steering gear 130, a reaction simulator 150 mounted on said shaft 120, a steering actuator 160 mounted on the shaft 140, a backup clutch 170 mounted between the shafts 120 and 140, and a controller 180 for controlling the reaction simulator 150, steering actuator 160, and clutch 170.

This steer-by-wire system 100 is arranged to timely cancel the connection between the steering wheel 110 and the steering gear 130 established by the clutch 170 so as to control the steering angle of the steering gear 130 by the controller 180 through the steering actuator 160 according to the steering angle of the steering wheel 110, while making the steering reaction controllable by the reaction simulator 150.

In such steer-by-wire, however, if a defect should occur in the motor or the like (for example, the steering actuator 160 or reaction simulator 150), a defect sometimes occurs in steering-based vehicle control. As a fail-safe mechanism, it has been proposed to use a solenoid clutch as the clutch 170 to interconnect the steering wheel and the steering gear so as to enable steering directly by the steering wheel. See, for example, Japanese Unexamined Patent Publication 2001-301639.

Figure 11:
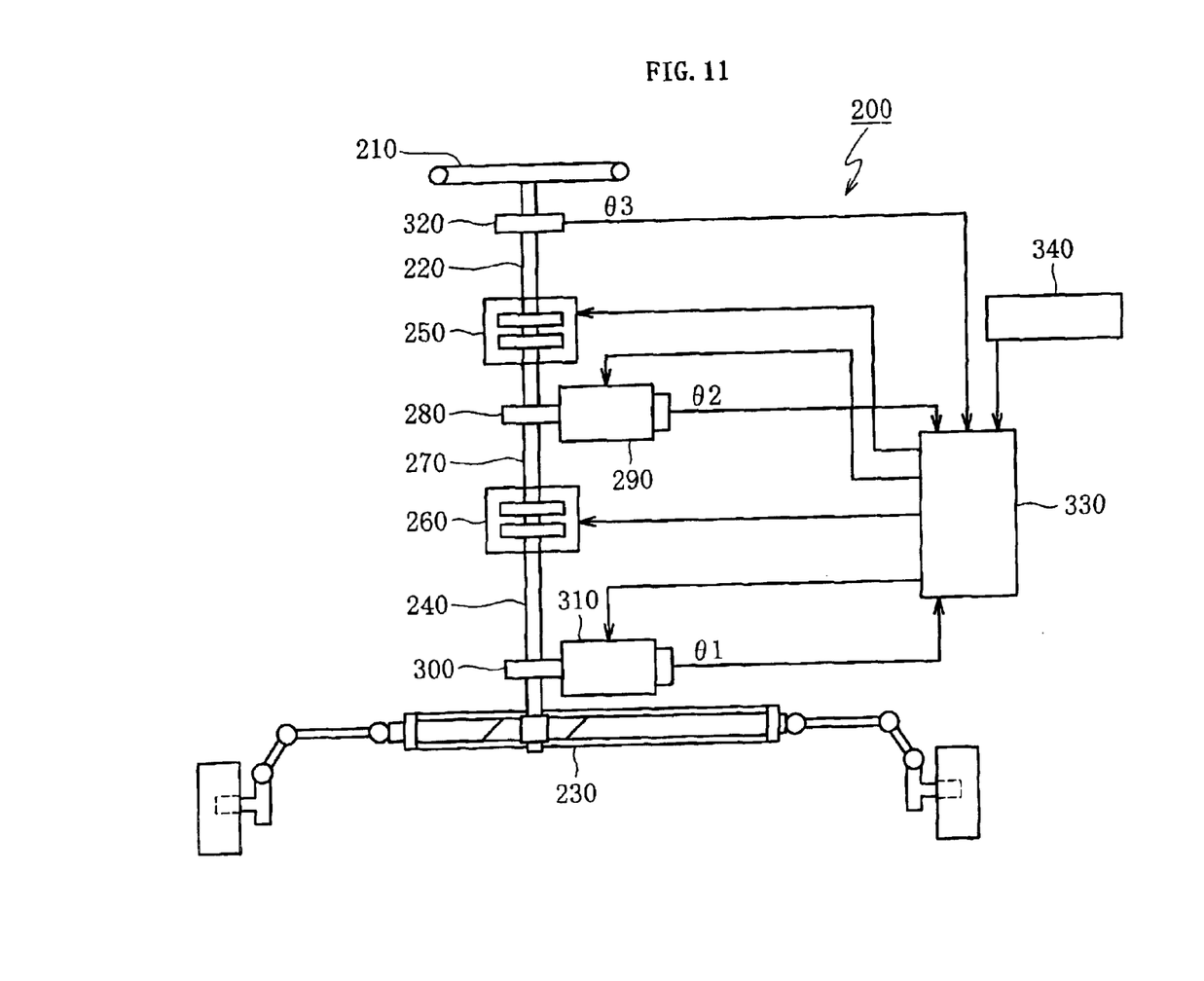
FIG. 11 is a schematic diagram of a steer-by-wire system using a conventional solenoid clutch.

A solenoid clutch type steer-by-wire 200 described in the Patent Publication, as shown in FIG. 11, comprises a steering wheel 210, a shaft 220 connected to the steering wheel 210, a steering gear 230, which is a steering wheel, a shaft 240 connected to the steering gear 230, a solenoid clutch 250 mounted on the shaft 220, a solenoid clutch 260 mounted on the shaft 240, a shaft 270 connecting these solenoid clutches 250 and 260, a gear 280 mounted on the shaft 270, a motor 290 for driving the gear 280, a gear 300 mounted on the shaft 240, a motor 310 for driving the gear 300, a steering angle sensor 320 mounted on the shaft 220, a controller 330 for controlling the solenoid clutches 250 and 260 and motors 290 and 310 by the motors 290 and 310 and a input signal from the steering angle sensor 320, and a car speed sensor 340 for detecting the car speed to input the latter into the controller 330.

The steer-by-wire system 200 described in the Patent Publication mentioned above uses solenoid clutches 250 and 260, so that if the power supply is interrupted by a malfunction of the electrical system or the like, switching operation of the solenoid clutches 250 and 260 cannot be effected, making direct connection between the steering wheel 210 and the steering gear 230 impossible. Further, the use of solenoid clutches has many drawbacks, such as the necessity of securing electric power supply capacity to some extent and the necessity of enlarging the installation space.

SUMMARY OF THE INVENTION

Accordingly, an object of the invention is to provide a steer-by-wire system having a fail-safe mechanism, which is less influenced by a malfunction of an electric system and which makes compact construction possible.

To solve the problem described above, the invention provides a steer-by-wire system comprising a steering wheel, a first shaft connected to the steering wheel, a first motor for transmitting a steering reaction to the first shaft, a steering gear, a second shaft connected to the steering gear, a second motor for transmitting a steering force to the second shaft, and a clutch mounted between the first and second shafts for switching the first and second shafts to a connected state or an unconnected state, wherein the clutch comprises an input member to which the rotation torque of the first shaft is inputted, a driven member connected to the second shaft, an engaging element receiving space defined between the input member and the driven member, an engaging element disposed in the engaging element receiving space and peripherally wedgewise engageable between the input member and the driven member, and an operating means disposed on axial one side of said engaging element receiving space and adapted to axially move the engaging elements to a wedgewise engageable position after the engaging elements have moved to the axial one side of the receiving space, and to a position where the engaging elements become non-engageable as they moves to the axial opposite side, and wherein when a defect occurs in the steer-by-wire system, the engaging element is moved to the wedgewise engageable position in the engaging element receiving space through the operating means to connect the first and second shafts so as to make steering possible by the steering wheel without the intermediary of the steer-by-wire system.

In the steer-by-wire system according to the invention, even when steering is made impossible as by a motor defect or when supply of power is interrupted, the steering wheel and the steering gear can be interconnected by the clutch, the fail-safe mechanism thus functioning. This clutch, unlike a dog clutch, is capable of connection irrespective of input-output phase difference. Furthermore, as compared with a solenoid clutch, size and weight reduction and cost reduction are possible, and the clutch is also advantageous from the standpoint of energy saving since there is no need to constantly apply power thereto.

The clutch is arranged such that when the engaging element is moved to the wedgewise engageable position in the engaging element receiving space by the operating means, the driven member concomitantly rotates relative to the input member, thereby connecting the first and second shafts. Further, when the engaging element is moved to the position in the engaging element receiving space where it becomes non-engageable, the driven member stops concomitantly rotating relative to the input member, thereby canceling the connection between the first and second shafts. The use of this clutch makes it possible to achieve size reduction, weight reduction and cost reduction as compared with solenoid clutches, and eliminates the need of constant electric power application, which is advantageous from the standpoint of energy saving. Further, it is also possible to manually cause the fail-safe mechanism to function when a malfunction occurs in the electric system.

Specifically, in the case where a defect occurs in the steer-by-wire system, the clutch can be manually or automatically operated to connect the shaft of the steering wheel to the shaft of the steering gear so as to establish the state in which the steering gear can be steered by the steering wheel.

Specifically, the clutch can comprise engaging elements in the form of taper rollers, a cage holding the taper rollers and axially movably disposed between the input member and the driven member, an engaging element receiving space defined such that between the input member and the driven member, it is narrower on one axial side and gradually widens toward the opposite side, the narrower side of the engaging element receiving space having an engaging position where the taper roller is peripherally engageable, the wider side having a canceling position for canceling the wedgelike engagement of the taper roller, the taper roller being disposed with its small diameter end directed to the narrower side of the engaging element receiving space, the operating means being adapted to axially move the taper rollers together with the cage, back and forth.

In this case, one end of the cage can be formed with a notch allowing peripheral elastic deformation of the cage. Thereby, when inputted rotation torque is transmitted or when the cage is axially relatively moved, the internal stress produced in the cage can be mitigated and breakage of the cage can be prevented.

Further, a clutch member peripherally engaging either the input member or the driven member can be provided and that the clutch member can be formed with a cam surface peripherally wedgewise engageable by a taper roller. Thus, providing the clutch member, as a separate member, having a profile cam surface wedgewise engageable by a taper roller, facilitates manufacture, such as the forming of a cam surface, making it possible to achieve cost reduction.

Further, the clutch member can be provided with a guide section for axially guiding the cage. This enables the cage to axially move in a straight line, suppressing the skewing or the like of the taper roller, whereby the cage can be prevented from having unexpected load applied thereto.

Further, the operating means may be composed of an elastically urging means for urging the taper rollers, together with the cage, to the narrower side of the engaging element receiving space, and an engaged state canceling means for moving the taper rollers, together with the cage, to the wider side of the engaging element receiving space against the elastically urging means to cancel the wedgelike engagement state of the taper rollers.

In this case, the elastically urging means may be a spring member incorporated between the input member or driven member and one end of the cage on the wider side of the engaging element receiving space. As the spring member, for example, a wave spring member having a wave-shaped cross section may be incorporated, whereby a reliable pressingly urging function can be obtained and size-compaction can be achieved.

The engaged state canceling means may be composed of an actuation member having a pressing section disposed to be axially opposed to the peripheral edge of the cage on the small end side of the taper rollers, a stationary member that is axially stationary relative to the engaging element receiving space, a cam mechanism that, when the actuation member is rotated in a predetermined direction relative to the stationary member, axially moves the actuation member to pressingly move the taper rollers together with the cage by the pressing section, and an operating section for turnably operating the actuation member.

The stationary member may have applied thereto a housing that rotatably armors the input member and driven member through bearings.

Further, an elastic restoration member may be provided for storing elastic force when the actuation member is turned relative to the stationary member and for separating the pressing section of the actuation member from the peripheral edge of the cage on the small diameter end side of the taper rollers when the actuation member is turned in the opposite direction relative to the stationary member.

The elastic restoration member may be in the form of a coil spring fastened at one end thereof to the actuation member and at the other end to the stationary member. It is recommended that such coil spring be mounted in the housing serving as a stationary-member and be fastened at one end thereof to the lever of the actuation member and at the other end to the housing.

The fail-safe mechanism may comprise an abnormality detection sensor for detecting abnormality in the system, a clutch switching actuator for operating the clutch, and a controller for operating the clutch switching actuator on the basis of an abnormality detection signal from the abnormality detection sensor, it being recommended that when an abnormality detection signal is received from the abnormality detection sensor, the controller operates the clutch to interconnect the first and second shafts through the clutch switching actuator. In this case, as compared with the case of the driver manually operating the clutch after he or she senses abnormality, there will arise no situation in which for example, the driver senses abnormality and gets into a panic, causing delay in switching the clutch; rather, the fail-safe mechanism can function automatically in a short time, and infallibly, so that the safety of the steer-by-wire system can be improved.

DESCRIPTION OF THE PREFERRED EMBODIMENTS

A steer-by-wire system having a fail-safe mechanism according to an embodiment of the invention will now be described with reference to the drawings.

Figure 1:
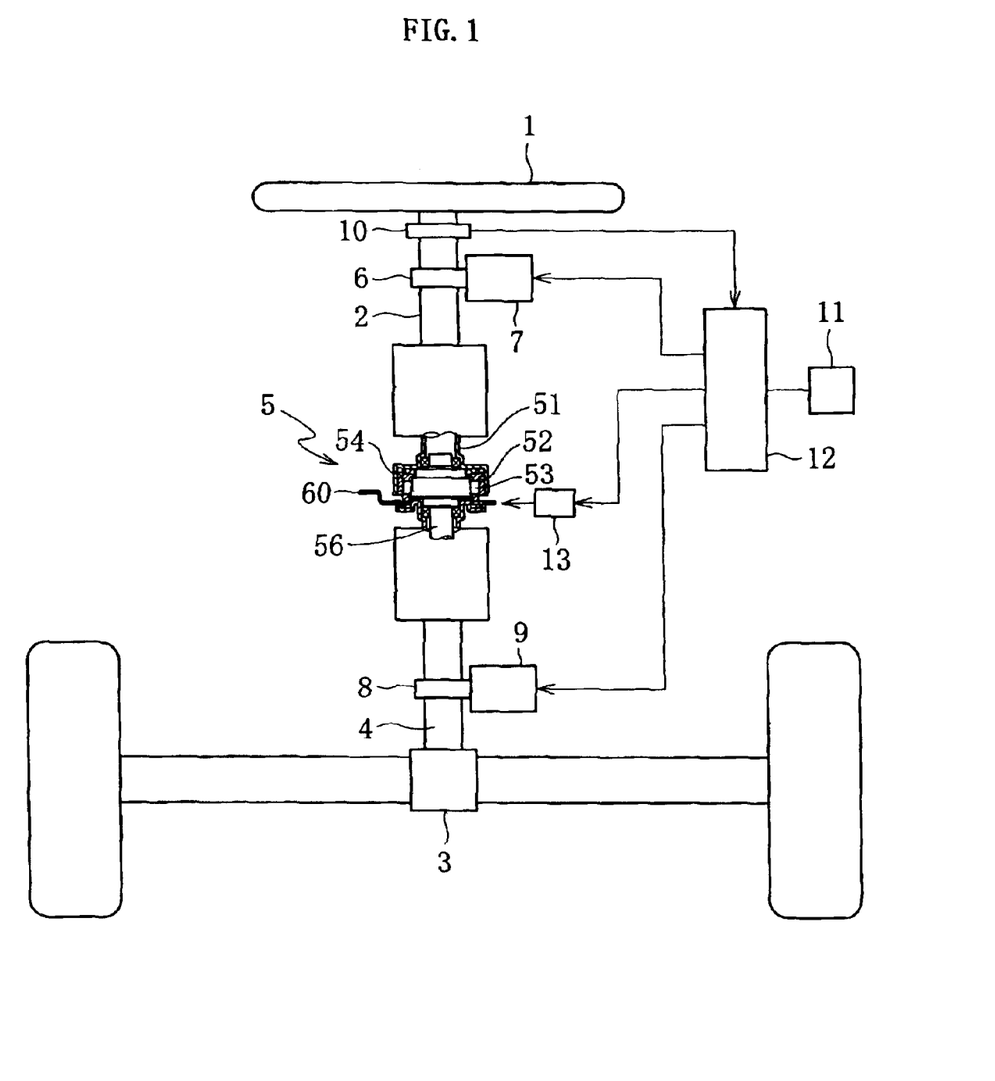
FIG. 1 is a schematic diagram of a steer-by-wire system according to an embodiment of the invention.

A steer-by-wire system having a fail-safe mechanism, as shown in FIG. 1, comprises a steering wheel 1, a first shaft 2 connected to the steering wheel 1, a steering gear 3, a second shaft 4 connected to the steering gear 3, and a mechanical clutch 5 mounted between the first and second shafts 2 and 4.

The first shaft 2 on the steering wheel 1 side has a first motor 7 mounted thereon for transmission of a steering reaction through a gear 6, while the second shaft 4 on the steering gear 3 side has a second motor 9 mounted thereon for transmission of a steering force to the steering gear 3 through a gear 8. Further, the clutch 5 has attached thereto a mechanism (for example, a clutch switching actuator 13) for switching the first and second shafts 2 and 4 to a connected or unconnected state timely in response to the state of the system.

A control mechanism for controlling this steer-by-wire system comprises any of the various sensors, such as a steering angle sensor 10 for detecting the steering angle of the steering wheel 1, an abnormality detection sensor 11 for detecting the abnormality of the system, and a controller (control device) 12. The steering angle sensor 10 is disposed, for example, in the first shaft 2, and the abnormality detection sensor 11 is installed, for example, in the first motor 7 and/or the second motor 9. The controller 12 delivers control signals to the first and second motors 7 and 9 and clutch switching actuator 13 on the basis of a signal concerning the steering angle detected by the steering angle sensor 10 and abnormality detection signal from the abnormality detection sensor 11. And the clutch 5 is arranged to be timely operated through the clutch switching actuator 13 to interconnect or disconnect the first and second shafts 2 and 4 on the steering wheel 1 side and on the steering gear 3 side, respectively, and that a reaction force corresponding to the steering angle of the steering wheel 1 be imparted to the first shaft 2 through the first motor 7 and the steering gear 3 is assist-steered through the second motor 9 and through the second shaft 4. Further, when the abnormality detection sensor 11 detects the abnormality of the steer-by-wire system, the controller 12 delivers a control signal to the clutch switching actuator 13 on the basis of an abnormality detection signal from the abnormality detection sensor 11. And the clutch 5 is arranged to be switched through the clutch switching actuator 13 so as to interconnect the first and second shafts 2 and 4.

The arrangement and operation of the clutch 5 used in this fail-safe mechanism for steer-by-wire systems will be described below.

Figure 2:
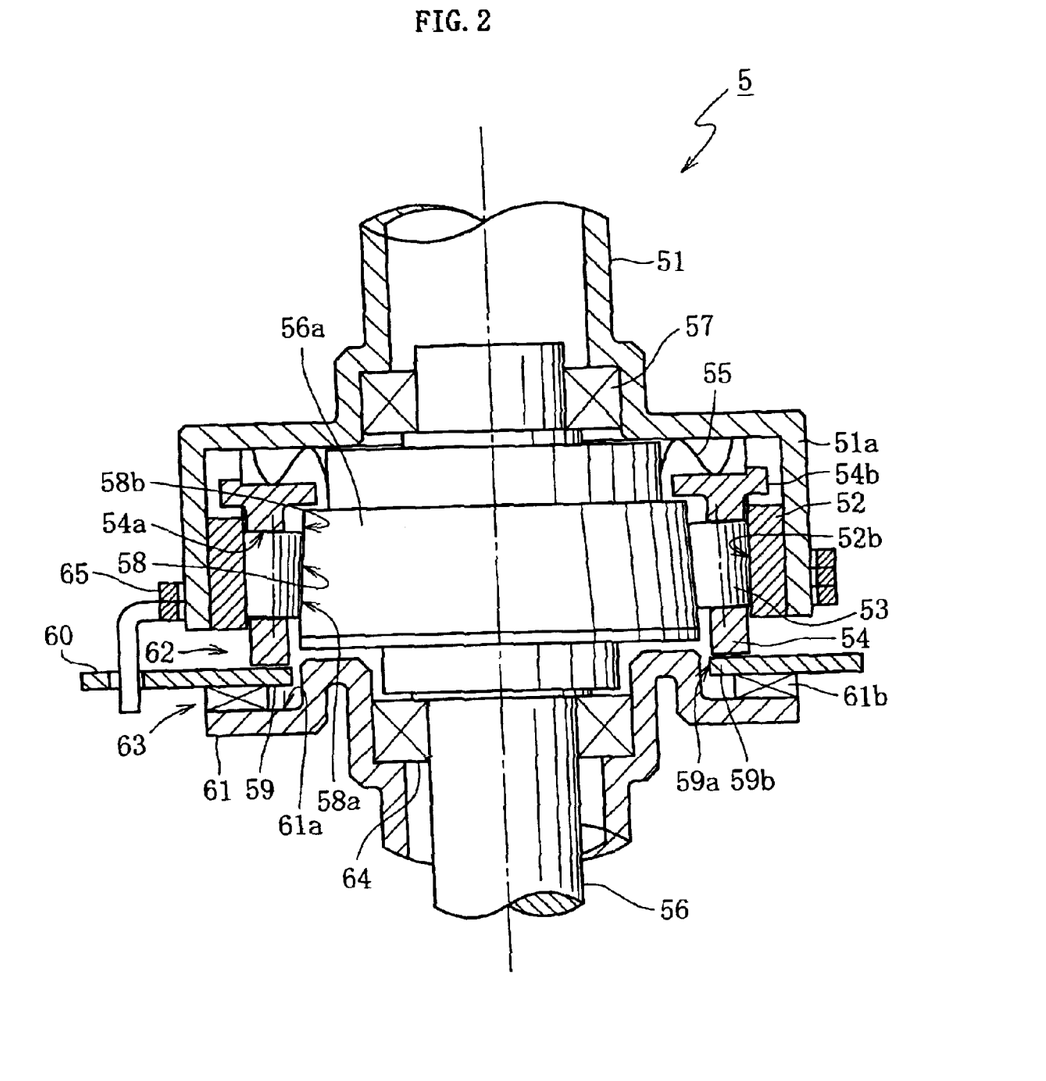
FIG. 2 is a side view, in longitudinal section, of an embodied clutch used for the steer-by-wire system of the invention.

The clutch 5, as shown in FIG. 2, comprises an input shaft 51 serving as a casing and connected to the first shaft 2 to have its rotation torque inputted thereto, a clutch member 52 mounted on the inner peripheral surface of the cylindrical section 51a of the input shaft 51, taper rollers 53 serving as engaging elements, a cage 54 for holding the taper rollers 53, a wave spring 55 serving as an elastic urging means for axially pressing the cage 54, an output shaft 56 serving as a driven member connected to the second shaft 4, an engaging element receiving space 58 defined between the clutch member 52 and the output shat 56, and an actuation member 59 serving as an operating means having an operating lever 60. In addition, FIG. 2 shows a state in which the output shaft 56 rotates as driven by the input shaft 51 and in which the first and second shafts 2 and 4 are interconnected.

Figure 3:
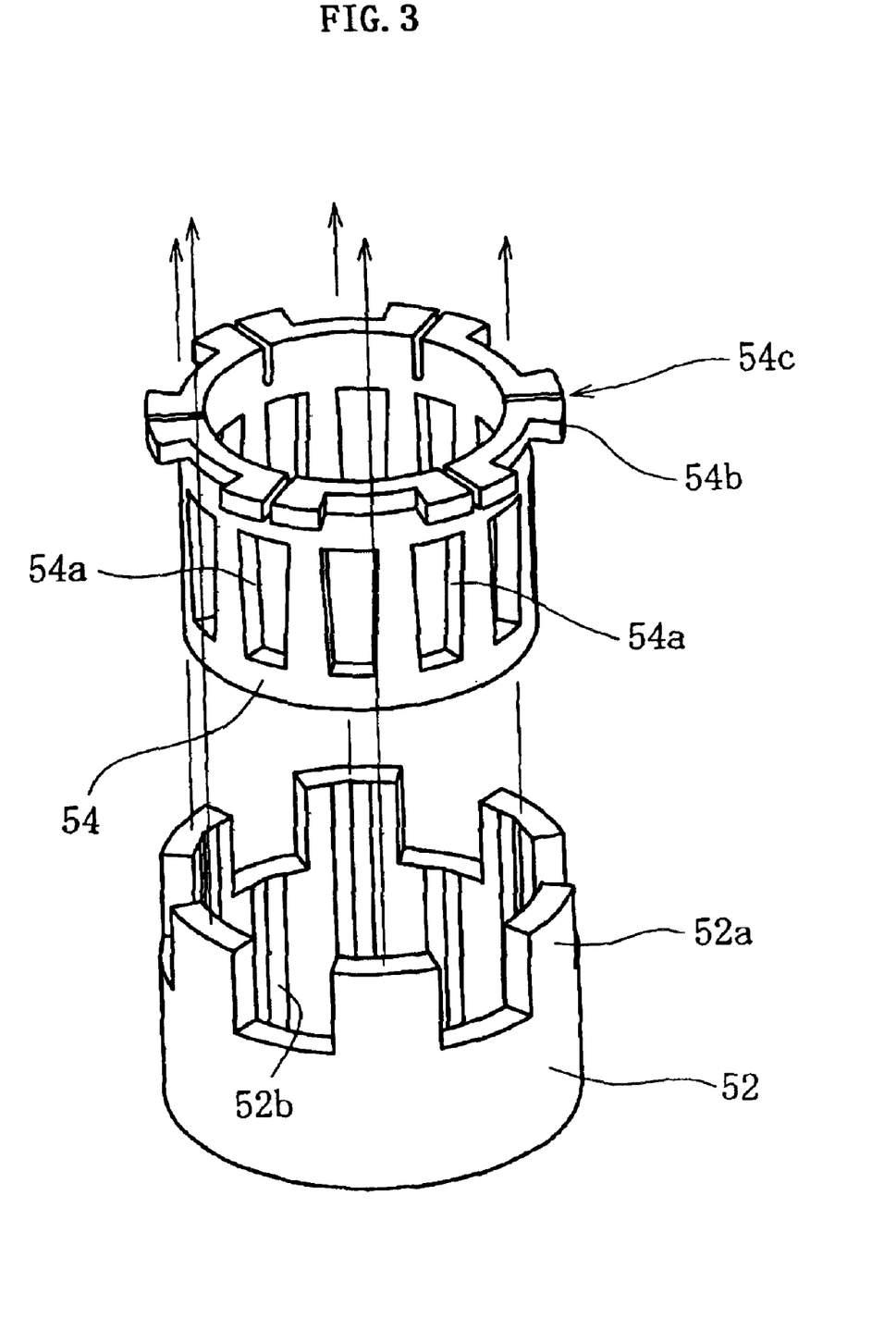
FIG. 3 is an exploded perspective view of a clutch member and a cage in the clutch of FIG. 2.
Figure 4:
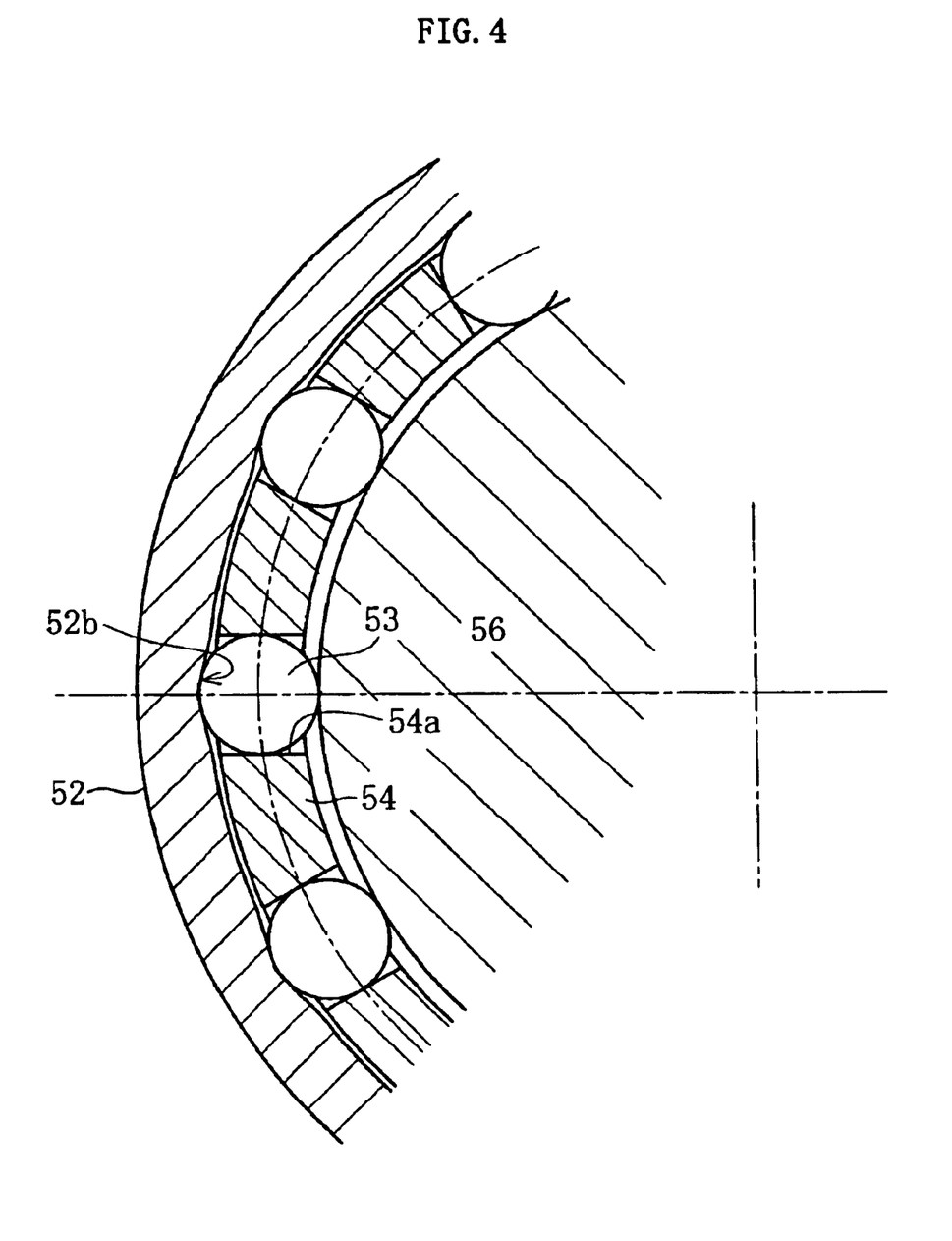
FIG. 4 is a principal enlarged cross-sectional view showing a cam surface formed on the clutch member.

The clutch member 52, as shown in FIG. 3, is a substantially cylindrical member having an outer diameter capable of being mounted on the inner peripheral surface of the cylindrical section 51a of the input shaft 51. The peripheral edge of the axial one side of the clutch member 52 (the upper peripheral edge in the figure) is provided with a plurality of axially extending engaging pieces 52a peripherally disposed at predetermined intervals. Further, the inner peripheral surface of the clutch member 52, as shown in FIG. 4, is formed with a plurality of cam surfaces 52b adapted to be engaged by the taper rollers 53 as will be later described, peripherally disposed at predetermined intervals correspondingly to the pockets 54a of the cage 54. This cam surface 52b is shaped such that in order for the taper roller 53 to engage it in both forward and reverse directions, it is deep in the center, becoming gradually shallower from the center toward both sides as seen in the direction of rotation.

Figure 5:
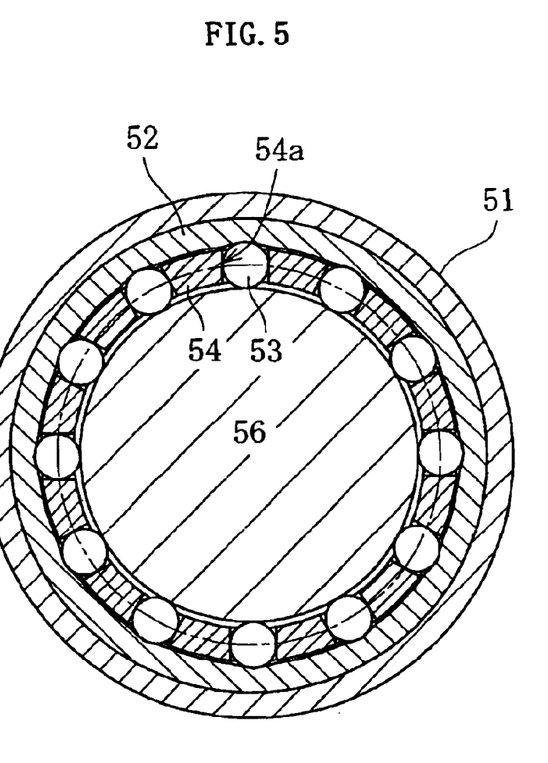
FIG. 5 is a cross-sectional view showing disposition of taper rollers.

The cage 54, as shown in FIG. 3, is a substantially cylindrical member having an outer diameter capable of being mounted on the inner peripheral surface of the clutch member 52 and is formed with a plurality of pockets 54a peripherally disposed at predetermined intervals for receiving the taper rollers 53. This cage 54, as shown in FIG. 5, has, for example, 12 pockets 54a peripherally formed at equal intervals. Each pocket 54a of the cage 54 is adapted to receive the taper roller 53 with a 0.1 mm or less peripheral clearance or a slight interference and with a 0.2 mm or less axial clearance. In addition, the pocket 54a of the cage 54 is formed, at least on either the outer diameter side or the inner diameter side, with a projection projecting inwardly of the pocket 54a so as to prevent the taper roller 53 from falling off the pocket 54a.

Further, the cage 54, as shown in FIG. 3, has a plurality of radially outwardly projecting engaging projections 54b at peripheral predetermined intervals, at one axial end (the upper end in the figure). The engaging projections 54b are arranged such that they can be incorporated between the engaging pieces 52a, 52a of the clutch member 52. The engaging projections 54b and the engaging pieces 52a of the clutch member 52 are peripherally engaged with each other and the cage 54 is incorporated in the inner periphery of the clutch member 52. Further, each engaging projection 54b is radially formed, at its peripheral center, with a notch 54c.

The cage 54, as shown in FIG. 3, is incorporated in the inner periphery of the clutch member 52 with the engaging pieces 52a of the clutch member 52 engaged with the engaging projection 54b of the cage 54. The cage 54 and the clutch member 52, as shown in FIG. 2, are mounted, in their assembled state, in the inner peripheral surface of the input shaft 51, with the engaging pieces 52a of the clutch member 52 incorporated on the inner surface of the cylindrical section 51a of the input shaft 51. This enables the cage 54 and clutch member 52 to be attached to the input shaft 51.

The clutch member 52 thus incorporated into the input shaft 51 rotates integrally with the input shaft 51 because of the engagement of the engaging pieces 52a with the periphery of the input shaft 51. Further, since the engaging projections 54b are peripherally engaged with the engaging pieces 52a of the clutch member 52, the cage 54 rotates integrally with the clutch member 52 and input shaft 51, and can be axially slid as guided by the engaging pieces 52a of the clutch member 52. Thus, the engaging pieces 52a of the clutch member 52 have the function of a guide for axially guiding the cage 54.

In addition, although omitted from illustration, an attaching jig is used in incorporating the cage 54 into the input shaft 51 with the taper rollers 53 attached to the cage 54 Further, in assembling the input shaft 51, clutch member 52, cage 54 and taper rollers 53, a wave spring 55 is incorporated between the input shaft 51 and the engaging projections 54b of the cage 54, as shown in FIG. 2.

The output shaft 56, as shown in FIG. 2, has an axially diameter-increase taper section 56a on the outer peripheral surface of the intermediate region. The diameter-reduced side (the upper side in the figure) of the taper section 56a has three level differences to reduce the diameter stepwise.

The assembly of input shaft 51, clutch member 52, cage 54 and taper rollers 53 shown in FIG. 2 is mounted on the output shaft 56 from the end on the diameter-reduced side of the taper section 56a. The wave spring 55 is incorporated in the first level difference section of the output shaft 56, the second level difference section is left free, and the third level difference section is rotatably mounted through a bearing 57 for rotation relative to the input shaft 51.

In this state, the engaging element receiving space 58 gradually narrowing toward axial one side (the lower side in the figure) is defined between the taper section 56a of the output shaft 56 and the inner peripheral surface of the clutch member 52, and the taper rollers 53 received in the pockets 54a of the cage 54 are disposed in this engaging element receiving space 58. The narrower side 58a of this engaging element receiving space 58 provides an engaging position where the taper rollers 53 are allowed to peripherally wedgewise engage the cam surfaces 52b of the clutch member 52, while the wider side 58b of the engaging element receiving space 58 provides a canceling position where the peripheral wedgelike engagement of the taper rollers 53 is cancelled, since the spacing between the taper 56a of the output shaft 56 and the inner peripheral surface of the clutch member 52 is wider than the outer diameter of the taper rollers 53.

Figure 6:
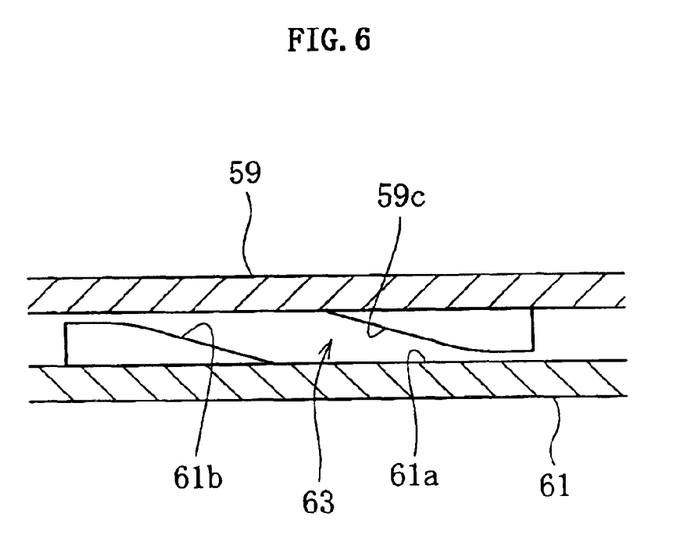
FIG. 6 is an enlarged front view showing a cam mechanism between an actuation member and a housing.

The actuation member 59 is centrally formed with a hole 59a for loose fit on the output shaft 56. The actuation member 59 is mounted on the output shaft 56 from the end on the diameter-increased side of the taper section 56a. The inner diameter end of the hole 59a in the actuation member 59, and its vicinity, serve as a pressing section 59b for pressing the cage 54. The opposite surface of the actuation member 59 (the surface not opposed to the cage 54), as shown in FIG. 6, is formed with a plurality of wedge projections 59c gradually projecting peripherally (in the figure, the left-handed direction as actuation member 59 is looked at from the lower end side of the output shaft 56).

The housing cover 61 is a cover member for sealing the open end of the housing (input shaft) 51 armoring the clutch portion, and cooperates with the input shaft 51 to form the housing. An opening 62 that peripherally opens is formed between the lower portion of the input shaft 51 and the upper portion of the housing cover 61, and the operating lever 60 of the actuation member 59 extends from the opening 62 until it is outside the housing (input shaft) 51 and the housing cover 61, so that the operating lever 60 can be operated for turning.

The housing cover 61 is mounted from the diameter-increased side of the taper section 56a of the output shaft 56 with its inner surface 61a opposed to the actuation member 59. The inner surface 61a of the housing cover 61, as shown in FIG. 6, is formed with a wedge projection 61b gradually projecting in a direction opposite to that for the wedge projection 59c of the actuation member 59 (in FIG. 2), the right-handed direction as the housing cover 61 is looked at from the lower side of the output shaft 56) for meshing with the wedge projection 59c of the actuation member 59. The wedge-projection 61b formed on the housing cover 61 and the wedge projections 59c formed on the actuation member 59 form a pair of cam mechanism 63 for moving the actuation member 59 axially (in the figure, upwardly).

The housing (input shaft) 51 is rotatably attached to the output shaft 56 by a bearing 57 installed on the third level difference section of the output shaft 56, as described above, and the housing cover 61, as shown in FIG. 2, is rotatably attached to the output shaft 56 through a bearing 64 installed between the housing cover 61 and the output shaft 56, and is fastened by a fastening means, for example, crimping by burring.

The input shaft 51, clutch member 52, actuation member 59, and housing cover 61 can be produced at low cost as by cold press work.

Next, the operation of this clutch 5 will be described. This clutch 5, as shown in FIG. 7, is arranged such that when the wedgelike engagement of the taper rollers 53 is cancelled by turning the operating lever 60 of the actuation member 59 to the left (solid line position), the input shaft 51 and the output shaft 56 are put in a disconnected state, so that the first and second shafts 2 and 4 are disconnected.

Figure 7:
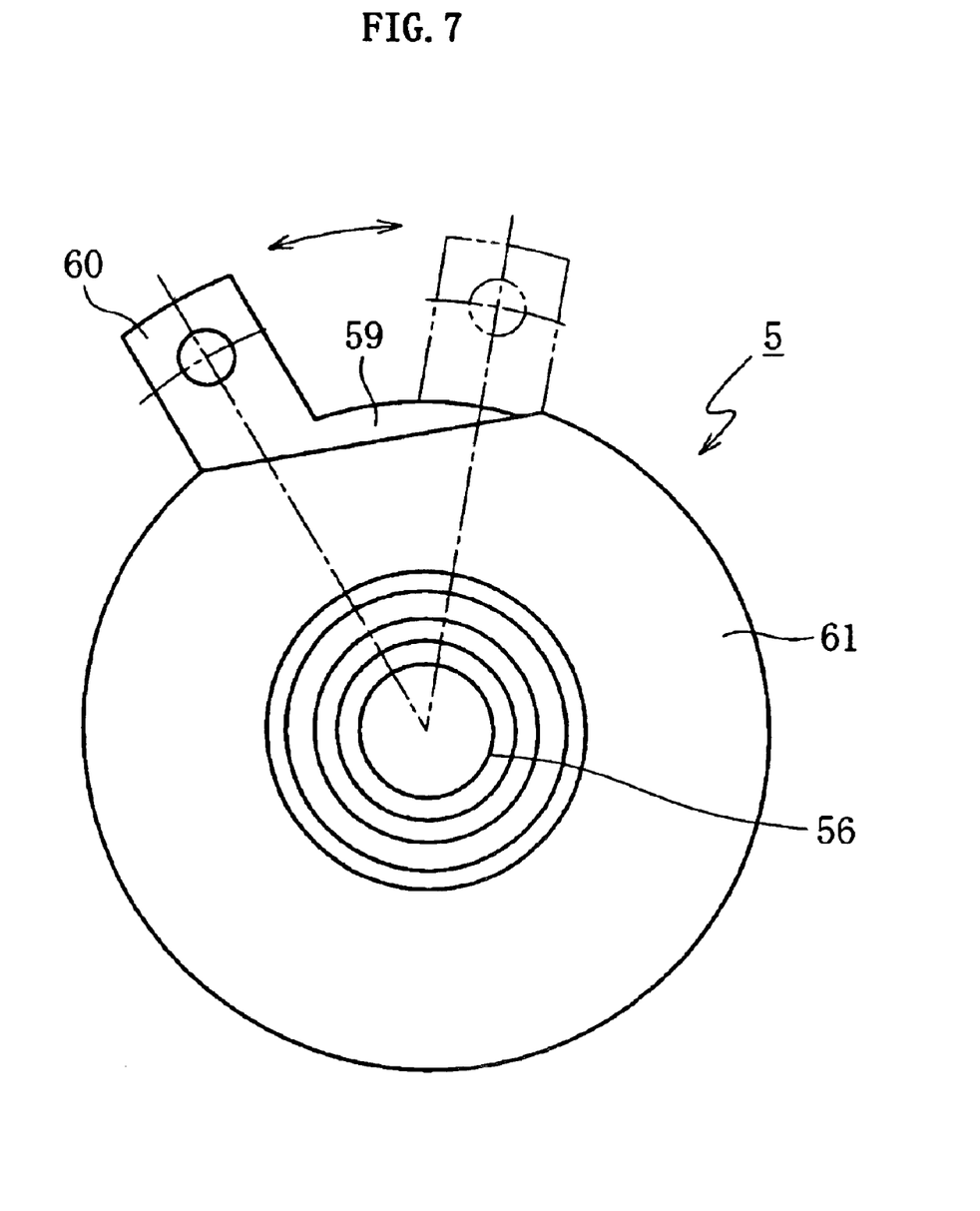
FIG. 7 is a bottom view showing the position of an operating lever in an unconnected state.
Figure 8A:
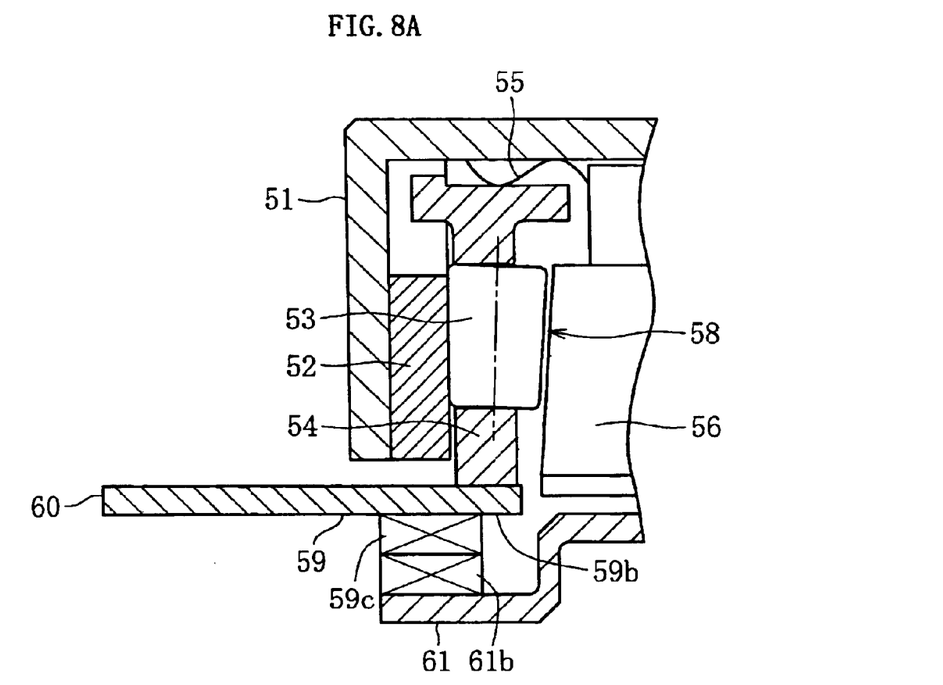
FIG. 8A is a principal enlarged longitudinal sectional view showing the positions of the actuation member and a housing cover in an unconnected state.
Figure 9A:
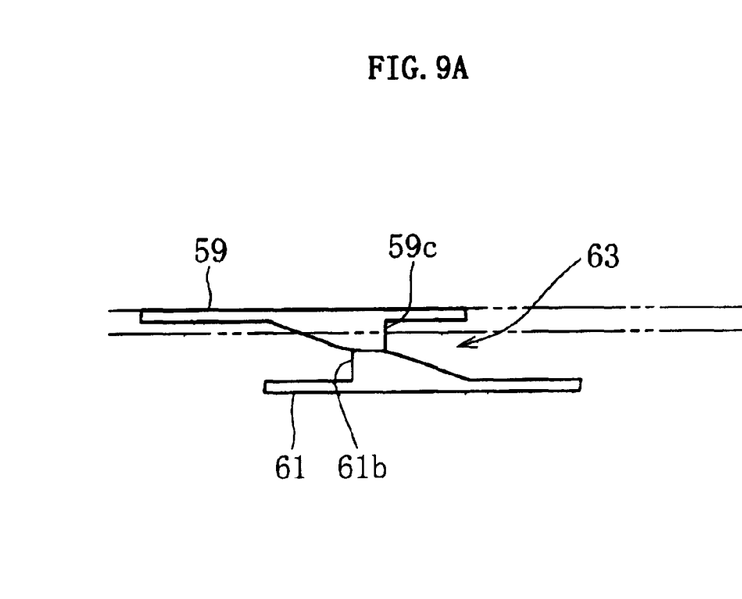
FIG. 9A is a principal enlarged front view showing a state in which the cam mechanism for the actuation member and the housing cover, which are in an unconnected state, is not engaged.

Specifically, the operating lever 60, as shown in the left-hand side solid line position of FIG. 7, is turned counterclockwise to a position where the wedge projection 59c of the actuation member 59 and the wedge projection 61b of the housing cover 61 mesh with each other. Thereby, the wedge projection 59c of the actuation member 59, as shown in FIGS. 8A and 9A, move onto the wedge projection 61b of the housing cover 61 and then axially upward. The cage 54 is pushed out to the wider side 58b of the engaging element receiving space 58 by the pressing section 59b of the actuation member 59 against the elastic force of the wave spring 55, and the taper rollers 53 move together with the cage 54 to the wider side 58b of the engaging element receiving space 58. When the cage 54 is positioned on the wider side 58b of the engaging element receiving space 58, the clearance between the output shaft 56 and the clutch member 52 is wider, so that the peripheral wedgelike engagement of the taper rollers with the cam surfaces 52b formed in the clutch member 52 is cancelled.

At this time, when rotation torque is delivered to the input shaft 51 from the first shaft 2 connected to the steering wheel 1, the taper rollers 53 rotate together with the cage 54, clutch member 52 and input shaft 51; however, since the clearance between the output shaft 56 and the clutch member 52 is wider, the taper rollers 53 do not wedgewise engage the cam surfaces 52b of the clutch member 52, so that the rotation torque is not transmitted to the output shaft 56. Thereby, the rotation torque is not transmitted from the first shaft 2 to the second shaft 4, making it impossible to steer the steering gear 3 directly by the steering wheel 1. Further, in this state, if the rotation torque is reversely delivered from the steering gear 3 to the output shaft 56, the rotation torque is not transmitted to the input shaft 51, either, and the steering resistance of the steering gear 3 comes not to be directly transmitted to the steering wheel 1.

Figure 8B:
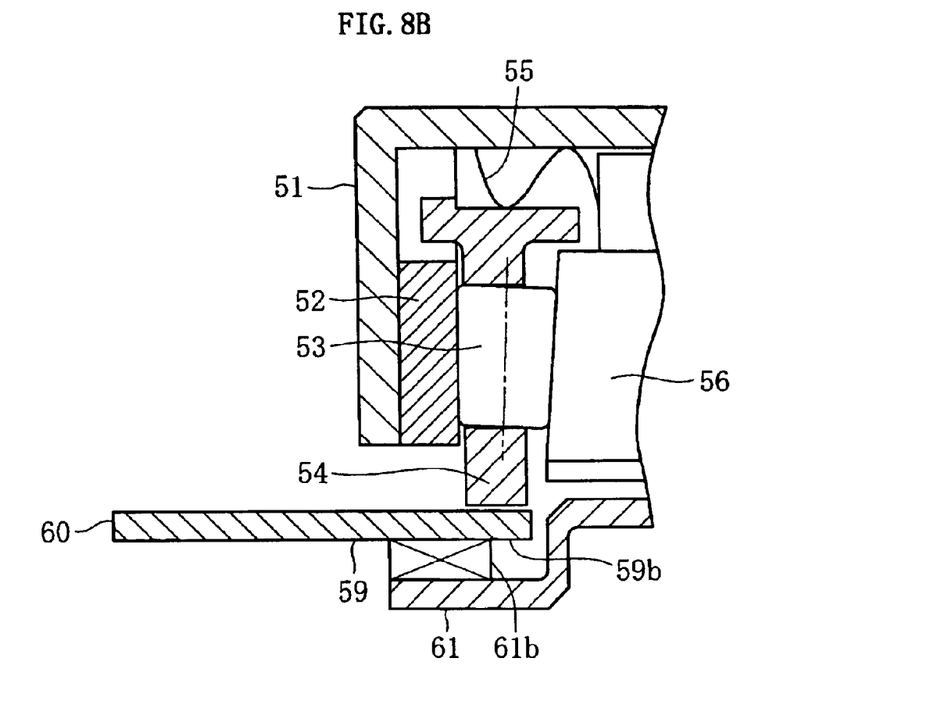
FIG. 8B is a principal enlarged longitudinal sectional view showing the positions of the actuation member and the housing cover in a connected state.
Figure 9B:
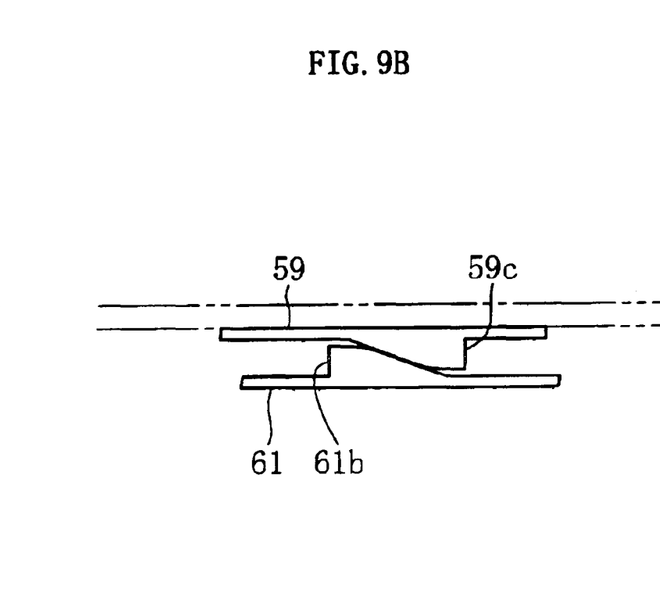
FIG. 9B is a principal enlarged front view showing a state in which the cam mechanism for the actuation member and the housing cover, which are in a connected state, is engaged.

On the other hand, when the operating lever 60 of the actuation member 59 is turned in the right-handed direction of FIG. 7 (the position shown in phantom lines), the cage 54, as shown in FIGS. 8B and 9B, is elastically urged to the narrower side 58a of the engaging element receiving space 58 by the wave spring 55, and the taper rollers 53 are pushed into the narrower side 58a of the engaging element receiving space 58, together with the cage 54. At this time, the wave spring 55 gives the taper rollers 53 a stabilized urging force against the engaging surfaces of the output shaft 56 and the clutch member 52. When the cage 54 is on the narrower side 58a of the engaging element receiving space 58, the radial clearance between the output shaft 56 and the clutch member 52 is narrower, so that when the rotation torque is delivered to the input shaft 51, the taper rollers 53 peripherally wedgewise engage the cam surfaces 52b formed in the clutch member 52. Thereby, when the rotation torque is delivered to the input shaft 51 from the first shaft 2 connected to the steering wheel 1, the rotation torque is transmitted to the output shaft 56, so that the output shaft 56 is driven for rotation in both forward and backward directions relative to the input shaft 51, and the steering gear 3 can be steered directly by the steering wheel 1. Further, in this case also, when the rotation torque is reversely delivered to the output shaft 56 from the second shaft connected to the steering gear 3, the rotation torque is reversely delivered from the output shaft 56 to the input shaft 51, since the taper rollers 53 are in peripheral wedgelike engagement with the cam surfaces 52b formed in the clutch member 52. Therefore, the steering resistance of the steering gear 3 comes to be transmitted directly to the steering wheel 1.

Thus, when the first shaft 2 connected to the steering wheel 1 and the second shaft connected to the steering gear 3 are to be switched from the disconnected state to the connected state, it is recommended that the operating lever 60 be turned to the right. This clutch 5 is provided with a coil spring 65 serving as a return spring disposed between the housing (input shaft) 51 and the operating lever 60, so that when the operating lever 60 is turned to the right to cancel the engagement between the wedge projection 59c of the actuation member 59 and the wedge projection 61b of the housing cover 61, the operating lever 60 is automatically turned to the left by the coil spring 65 to return to its original position.

At this time, although the cage 54 is peripherally subjected to a large force through the taper rollers 53, the notches 54c (see FIG. 3) formed in the engaging projections 54b of the cage 54 allow peripheral elastic deformation of the cage 54, so that the cage 54 can be prevented from being broken.

Referring back to FIG. 1, the operation of the steer-by-wire system and its fail-safe mechanism will be described.

When the steer-by-wire system is normally functioning, the clutch 5 is operated by the controller 12 through the clutch switching actuator 13 on the basis of an input signal from a sensor, such as the steering angle sensor 10, and the first shaft 2 connected to the steering wheel 1 and the second shaft 4 connected to the steering gear 3 are timely interconnected or disconnected. And the arrangement is such that when the first and second shafts 2 and 4 have been disconnected by the clutch 5, the steering angle of the first shaft 2 is detected by the steering angle sensor 10, driving the first motor 7 by the controller 12, imparting a suitable steering reaction to the steering wheel 1 through the first shaft 2, and driving the second motor 9 to give the second shaft 4 a steering angle corresponding to the steering angle of the first shaft 2, thereby assisting the steering gear 3 in steering.

When a motor defect or the like occurs in the steer-by-wire system, the fail-safe mechanism for steer-by-wire systems detects the abnormality, for example, on the basis of an abnormality detection signal from the abnormality detection sensor 11, operating the operating lever 60 of the clutch 5, automatically or manually, to the lock position by en external force, interconnecting the first shaft 2 connected to the steering wheel 1 and the second shaft 4 connected to the steering gear 3, thus establishing a state in which the steering gear 3 can be-steered directly by the steering wheel 1.

When it is desired to have the fail-safe mechanism automatically function, it is recommendable to send a control signal from the controller 12 to the clutch switching actuator 13 on the basis of an abnormality detection signal from the abnormality detection sensor 11 so as to operate the clutch 5 through the clutch switching actuator 13. The clutch switching actuator 13 is constructed, for example, by using a solenoid. It is recommended that the arrangement be such that when abnormality is detected, supply of power to the solenoid is interrupted and the operating lever 60 of the clutch 5 is operated to move to the lock position by the elastic member, such as a spring.

The fail-safe mechanism for steer-by-wire systems, and the steer-by-wire system according to an embodiment of the invention have been described so far, but the invention is not limited to the above embodiment.

Particularly, the clutch 5 is not limited to what has been shown by the embodiment, and other arrangements may be used provided that they have the same operation as described above.

What is claimed is:

1. A steer-by-wire system comprising a steering wheel, a first shaft connected to the steering wheel, a first motor for transmitting a steering reaction to the first shaft, a steering gear, a second shaft connected to the steering gear, a second motor for transmitting a steering force to the second shaft, and a clutch mounted between said first and second shafts for switching the first and second shafts to a connected state or a disconnected state, wherein said clutch comprises an input member to which a rotation torque from said first shaft is delivered, a driven member connected to said second shaft, an engaging element receiving space defined between said input member and said driven member, engaging elements disposed in said engaging element receiving space and capable peripheral wedging engagement between said input member and said driven member, and an operating means disposed on axial one side of said engaging element receiving space and adapted to axially move the engaging elements to a wedgewise engageable position when they have moved to the axial one side of the receiving space, and to a position where the engaging elements become non-engageable when they move in the axially opposite direction, and wherein when a defect occurs in the steer-by-wire system, said engaging elements are moved to the wedgewise engageable position in the engaging element receiving space by said operating means to interconnect the first and second shafts, thus making steering possible not by steer-by-wire system but by direct steering.

2. A steer-by-wire system as set forth in claim 1, wherein said engaging element are taper rollers, and said mechanism includes a cage holding said taper rollers and axially movably disposed between said input member and said driven member, wherein said engaging element receiving space is defined such that between said input member and said driven member, it is narrower on one axial side and gradually widens toward the opposite side, the narrower side of the engaging element receiving space having an engaging position where the taper rollers are peripherally engageable, the wider side having a canceling position where the wedge-like engagement of said taper roller is cancelled, and wherein said taper rollers are disposed with their smaller diameter ends directed to the narrower side of the engaging element receiving space, and said operating means moves the taper rollers axially back and forth together with the cage.

3. A steer-by-wire system as set forth in claim 2, wherein the cage has a notch in one end to allow peripheral elastic deformation of the cage.

4. A steer-by-wire system as set forth in claim 2, wherein a clutch member peripherally engaging either said input member or said driven member is installed, said clutch member being formed with cam surfaces adapted to be peripherally wedgewise engaged by the taper rollers.

5. A steer-by-wire system as set forth in claim 4, wherein said clutch member is provided with a guide section for axially guiding the cage.

6. A steer-by-wire system as set forth in claims 2, wherein said operating means comprises an elastic urging means for urging the taper rollers together with the cage to the narrower side of the engaging element receiving space, and an engaged state canceling means for moving said taper rollers together with the cage against said elastic urging means against said elastic urging means to the wider side of the engagement element receiving space so as to cancel the wedging engagement of said taper rollers.

7. A steer-by-wire system as set forth in claim 6, wherein said elastic urging means comprises a spring member installed between said input member or driven member and one end of the cage in the wider side of said engaging element receiving space.

8. A steer-by-wire system as set forth in claim 2, wherein said engaged state canceling means comprises an actuation member having a pressing section disposed in axially opposed relation to the peripheral edge of said cage on the smaller diameter end side of the taper rollers, a stationary member axially stationary relative to said engaging element receiving space, a cam mechanism that axially moves the actuation member when the latter is turned relative to the stationary member in a predetermined direction, and pressingly moves the taper rollers together with the cage by said pressing section, and an operating section for turnably operating said actuation member.

9. A steer-by-wire system as set forth in claim 8, wherein said stationary member is a housing rotatably armoring the input member and driven member through bearings.

10. A steer-by-wire system as set forth in claim 8, further comprising an elastic restoration member for storing elastic force when the actuation member is turned relative to the stationary member and for separating the pressing section of the actuation member from the peripheral edge of the cage on the small diameter side of the taper rollers when the actuation member is turned in the opposite direction relative to the stationary member.

11. A steer-by-wire system as set forth in claim 10, wherein the elastic restoration member is in the form of a coil spring fastened at one end thereof to the actuation member and at the other end to the stationary member.

12. A steer-by-wire system as set forth in claim 1, wherein said fail-safe mechanism comprises an abnormality detection sensor for detecting abnormality in the system, a clutch switching actuator for operating the clutch, and a controller for operating the clutch switching actuator on the basis of an abnormality detection signal from the abnormality detection sensor, and wherein, upon reception of an abnormality detection signal from the abnormality detection sensor, said controller operates the clutch to interconnect the first and second shafts through the clutch switching actuator.

* * * * *